United States Patent

Giroud et al.

[11] Patent Number: 6,076,403
[45] Date of Patent: Jun. 20, 2000

[54] ELECTROMAGNETIC ACCELEROMETER

[75] Inventors: Pierre Giroud, Bourg les Valence; Pierre Guillemin, Chabeuil; André Migeon, Barcelonne; Sylvie Pedraza-Ramos, Valence, all of France

[73] Assignee: Sextant Avionique, Velizy Villacoublay, France

[21] Appl. No.: 09/077,889

[22] PCT Filed: Dec. 10, 1996

[86] PCT No.: PCT/FR96/01969

§ 371 Date: May 4, 1999

§ 102(e) Date: Apr. 5, 1999

[87] PCT Pub. No.: WO97/22011

PCT Pub. Date: Jun. 19, 1997

[30] Foreign Application Priority Data

Dec. 12, 1995 [FR] France .................................. 95 14687

[51] Int. Cl.[7] .................................................. G01P 15/08
[52] U.S. Cl. ........................... 73/514.31; 73/514; 73/340; 73/514.17
[58] Field of Search .............................. 73/514.01, 514.16, 73/514.17, 514.31, 514.34, DIG. 4; 310/329; 324/207.11

[56] References Cited

U.S. PATENT DOCUMENTS

| 4,314,202 | 2/1982 | Okubo ..................................... 324/207 |
| 4,446,741 | 5/1984 | Sirokorad et al. ......................... 73/654 |
| 4,473,768 | 9/1984 | Kerr et al. ............................... 310/329 |
| 5,693,883 | 12/1997 | Giroud et al. ....................... 73/514.24 |

Primary Examiner—Richard A. Moller
Attorney, Agent, or Firm—Oblon, Spivak, McClelland, Maier & Neustadt, P.C.

[57] ABSTRACT

An electromagnetic accelerometer includes a peripheral frame, a mass suspended from the peripheral frame, a plurality of strain gauges configured to detect displacement of the mass, and a magnetic motor. The magnetic motor includes a first pole piece defining a chamber, a second pole piece positioned in the chamber and coupled to the mass, a permanent magnet coupled to the first pole piece, and a coil coupled to the first pole piece. The permanent magnet and the coil surround at least a portion of the second pole piece.

10 Claims, 5 Drawing Sheets

ELECTROMAGNETIC ACCELEROMETER

BACKGROUND OF THE INVENTION

Field of the Invention

The field of the invention is that of electromagnetic accelerometers including a moving mass and piezoelectric gauges for detecting the displacement of this mass and controlling a system that controls the position of this mass, using phenomena of electromagnetic induction. This type of accelerometer can be produced, in particular, from silicon wafers using technologies derived from those developed from the manufacture of integrated circuits and can, in particular, be used in geophones for making a very detailed analysis of the nature of the Earth's strata in order to detect any sources of oil.

DISCUSSION OF THE BACKGROUND

In general, the strain gauges of an electromagnetic accelerometer are intended, by means of an electronic circuit, to generate a supply current for a coil which, using phenomena of electromagnetic induction, compensates for a displacement of the moving mass under the effect of external conditions, for example of seismic movements involved in geophone applications. The magnitude of the acceleration experienced by the moving mass is deduced from the value of the supply current to the coil needed to prevent the displacement of the moving mass. The overall principle of operation of this type of accelerometer is described in FIG. 1.

Figure 1:
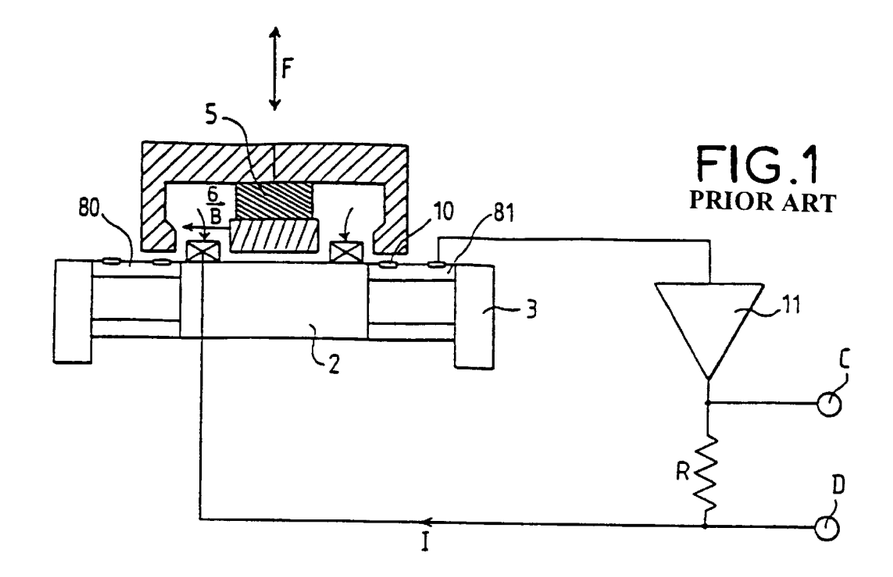
FIG. 1 illustrates an accelerometer comprising an electromagnetic control system according to the known art.

A moving mass 2 is suspended by arms 80 and 81 from a fixed frame 3. The moving mass, the suspension arms and the fixed frame may advantageously be made from silicon wafers. A coil 6 is attached to the moving mass 2. This coil is associated with a magnetic circuit consisting of two pole pieces and the pole pieces define two gaps for routing the magnetic field of a permanent magnet 5 the axis of magnetization of which is perpendicular to the surface of the moving mass 2. Suspension arms, for example the upper arms 80 and 81, include strain gauges 10, which constitute detectors of the displacement of the moving mass. These strain gauges are intended, by means of an electronic circuit 11, to generate a supply current I for the coil 6 so that using phenomena of electromagnetic induction, they can compensate for a displacement of the moving mass 2 under the effect of external conditions, for example seismic movements. Compensation for the displacement of the moving mass 2 under the action of the electromagnetic-induction forces takes place along a direction depicted by the double-headed arrow F which corresponds to the axis of magnetization of the magnet 5. The magnitude of the displacement that the moving mass 2 would have experienced under the effect of the external conditions is deduced from the value of the current I needed by the control system to prevent the displacement of the moving mass. The value of the current I is extracted, for example, by means of a resistor R, in the form of a voltage between two output terminals C and D.

A limit on the sensitivity of this kind of accelerometer lies in the stiffness of the suspension arms, which are typically made of silicon, which means that a low force exerted on the moving mass causes no displacement thereof.

Now, in applications such as those for which the present invention is intended, and which have to do with identifying the Earth's strata, very high sensitivity is absolutely essential. This kind of device operates according to the following principle. Excitation sources placed at ground level send mechanical waves into the ground, and these act on accelerometers. The response of the said accelerometers provides information on the nature of the Earth's strata encountered by the mechanical waves created.

SUMMARY OF THE INVENTION

In order to solve the problem of the positive stiffness of the suspension arms of the moving masses present in electromagnetic accelerometers like those described earlier, the subject of the invention is an accelerometer which uses a magnetic motor with negative stiffness, opposing the positive stiffness of the suspension arms and contributing to increasing the sensitivity of the said accelerometer.

More specifically, the subject of the invention is an electromagnetic accelerometer comprising a magnetic motor 1 and a moving mass 2 suspended from a peripheral frame 3 and associated with strain gauges constituting detectors of the displacement of the moving mass, characterized in that the magnetic motor comprises:

a chamber formed of a pole piece 12 comprising a permanent magnet 5, the said chamber comprising a coil 6 and being fixed to the peripheral frame;

a pole piece 14 placed in the chamber and fixed to the moving mass 2.

The pole piece 14 may be fixed to the moving mass via a non-magnetic element.

Advantageously, the chamber is a pole piece with symmetry of revolution.

According to an alternative form of the invention, the pole piece 12 comprises a peripheral part 121 attached to the peripheral frame 3, an internal part 122, the magnet 5 connecting the peripheral part 121 with the internal part 122, the coil 6 being fixed to the internal part 122 and surrounding the pole piece 14.

According to one alternative form of the invention, the pole piece 14 has a central part 141 perpendicular to the plane $P_1$ of the moving mass, two parts 142 and 143 perpendicular to the said central part, so as to define gaps in planes parallel to the plane $P_1$ between the piece 14 and the piece 12.

According to an alternative form of the invention, the moving mass and the fixed frame are defined in a stack of two silicon wafers known as the upper wafer 7 and the lower wafer 8:

the upper wafer comprising:
  the upper part 21 of the moving mass including two counter-stops 41 and 42 along an axis Y defined in the plane of the moving mass;
  the upper part 31 of the fixed frame including two stops 43 and 44 along an axis X perpendicular to the axis Y and defined in the plane of the moving mass;
  the parts 21 and 31 being connected by suspension arms 80 and 81 including piezoelectric gauges;

the lower wafer comprising:
  the lower part 22 of the moving mass including two counter-stops 45 and 46 along the axis X;
  the lower part 32 of the fixed frame including two stops 47 and 48 along the axis Y;

the counter-stops 41 and 42 being opposite the stops 47 and 48;

the counter-stops 45 and 46 being opposite the stops 43 and 44.

By convention, the stops are defined as fixed elements of the accelerometer against which counterstops, which are moving elements of the accelerometer, come to rest.

According to one alternative form of the invention, the accelerometer is characterized in that:

the part 21 comprises a central part 23 and two immobilizing arms 24 and 25 lying one on either side of the said central part along the axis Y;

the part 31 comprises a peripheral part 33 and two arms 34 and 35 lying inside the peripheral part, along the axis X, the wafer 7 comprising two suspension arms 80 and 81 connecting the central part 13 to the arms 34 and 35, the said suspension arms 80 and 81 comprising piezoelectric gauges;

the part (22) comprises a central part (26) and two immobilizing arms (27) and (28) lying one on either side of the said central part, along the axis X;

the part 32 comprises a peripheral part 36 and two arms 37 and 38 lying inside the peripheral part along the axis Y;

the counter-stops 41 and 42 being defined in the immobilizing arms 24 and 25;

the stops 43 and 44 being defined in the arms 34 and 35;

the counter-stops 45 and 46 being defined in the immobilizing arms 27 and 28;

the counter-stops 47 and 48 being defined in the arms 37 and 38.

According to an alternative form of the invention, the wafers 7 and 8 of the accelerometer comprise slender guide arms connecting the moving mass 2 to the frame 3 in such a way that only movements of the moving mass along an axis Z perpendicular to the plane of the said mass are possible. Advantageously, these arms may lie along two axes oriented at 45° to the axes X and Y and lying towards the upper part of the wafer 7 and towards the lower part of the wafer 8.

BRIEF DESCRIPTION OF THE DRAWINGS

The invention will be better understood from the description which will follow, which is given without implied limitation, and from the appended figures, among which:

FIG. 3 illustrates an example of a moving mass and of a peripheral frame used in an accelerometer according to the invention;

DETAILED DESCRIPTION OF THE PREFERRED EMBODIMENTS

An accelerometer according to the invention includes a moving mass 2 suspended via suspension arms 80 and 81 (FIG. 2) from a peripheral frame 3. The suspension arms 80 and 81 comprise piezoelectric gauges which are not depicted in FIG. 2. The moving mass 2 is secured to a pole piece 14. This pole piece 14 is inserted in a chamber which consists of a pole piece 12. The pole piece 12 itself consists of a main part 121, of a secondary part 122; the main and secondary parts being connected by a permanent magnet 5. A coil 6 is secured to the secondary part 122.

Figure 2:
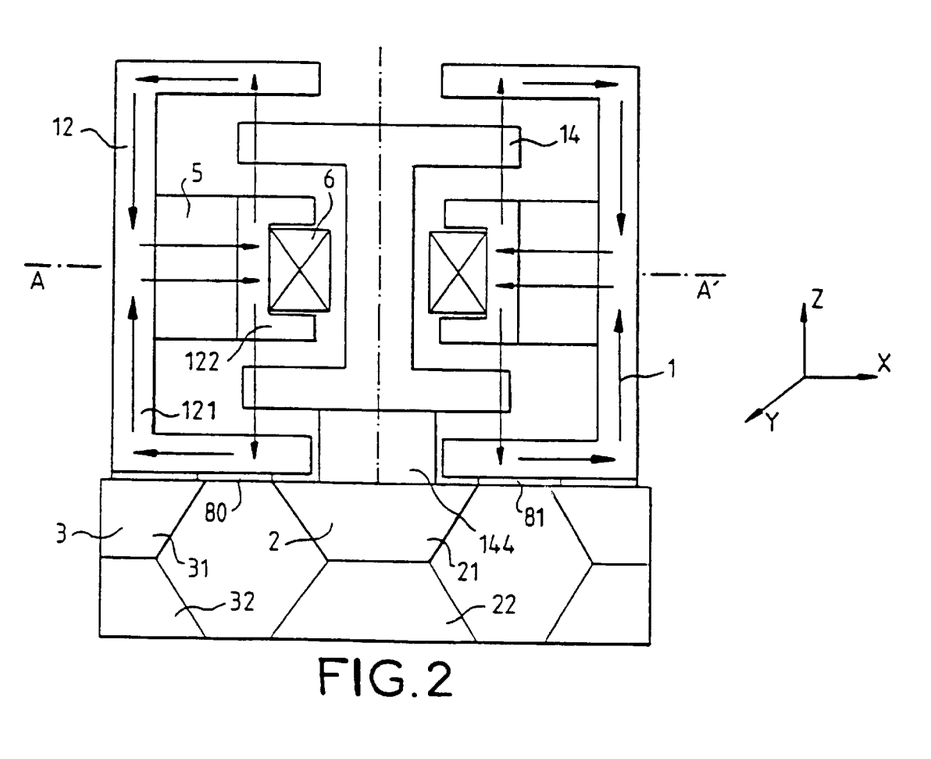
FIG. 2 illustrates an example of a motor used in an accelerometer according to the invention.

In this example of a negative-stiffness motor, the pole piece 14 is subjected to the presence of various magnetic fields depicted by arrows in FIG. 2. These arrows relate to the magnetic fields created by the permanent magnet 5. This pole piece 14 is in unstable equilibrium and tends to shift along an axis Z perpendicular to the plane of the moving mass 2. As it moves away from a middle position depicted by the axis AA', it carries the moving mass with it and creates stresses in the piezoelectric gauges which are located on the suspension arms 80 and 81. This manifests itself via an electronic circuit, which is not depicted, in a return current which acts on the coil 6 and tends to keep the assembly in a fixed position.

What happens is that the supply field of the coil 6 creates a magnetic field at the pole piece 14 and this tends to make the said piece return to the mid-plane AA'. For example, if in this position of unstable equilibrium the piece 14 tends to move closer to the silicon part, the control current created in the coil tends to move the said piece 14 away from the silicon part. The electromagnetic motor, which is said to have negative stiffness, used by an accelerometer according to the invention is therefore supplied with current in order to allow the piezoelectric gauges to bring the moving mass back into a state of equilibrium via the piece 14.

When this accelerometer is subjected to external stresses, especially of the seismic movements type, it operates in a similar way to the way described earlier; the motor tends continuously to return the piece 14 to the mid-plane AA'.

This type of control makes it possible to use suspension arms 80, 81 which are thick enough to prevent breakage while at the same time maintaining sufficient sensitivity on account of the reduction in overall stiffness of the accelerometer as a whole.

Given the high sensitivity required of the accelerometer, low accelerations along the sensitive axis Z lead to high stresses in the silicon piezoelectric gauges, and the yield point could soon be reached. In order to alleviate this drawback, the accelerometer according to the invention comprises systems of stops which limit the displacements of the moving parts along the sensitive axis, these systems being built into the sensitive part which consists of the moving mass connected via suspension arms comprising strain gauges, to a fixed frame.

According to one alternative form of the invention, this sensitive part of the accelerometer consists of two monocrystalline silicon wafers 7 and 8, in which there are defined, by the elimination of material (by chemical etching), the suspension arms, the piezoresistive gauges and electrical conductors for connecting the gauges to the outside.

More specifically, according to one alternative form of the invention, all the pieces 12 and 14 are secured to a moving mass 2 and to a peripheral frame 3 which are produced from a stack of two silicon wafers.

As illustrated in FIG. 2, the peripheral frame comprises a so-called upper part, the part 31, produced in a first silicon wafer called the upper wafer 7, and a part known as the lower part, the part 32, produced from a second silicon wafer known as the lower wafer 8. The part 31 is secured to the pieces 121 and 122. Likewise, the moving mass 2 comprises a so-called upper part, the part 21, made in the wafer 7 and a so-called lower part, the part 22, made in the wafer 8. The part 21 is connected to the piece 14 via an element 144. In this FIG. 2, the parts 21, 22, 31 and 32 have been depicted very diagrammatically and will be described in greater detail using FIGS. 3*a*, 3*b*, 4*a* and 4*b*.

Figure 3A:
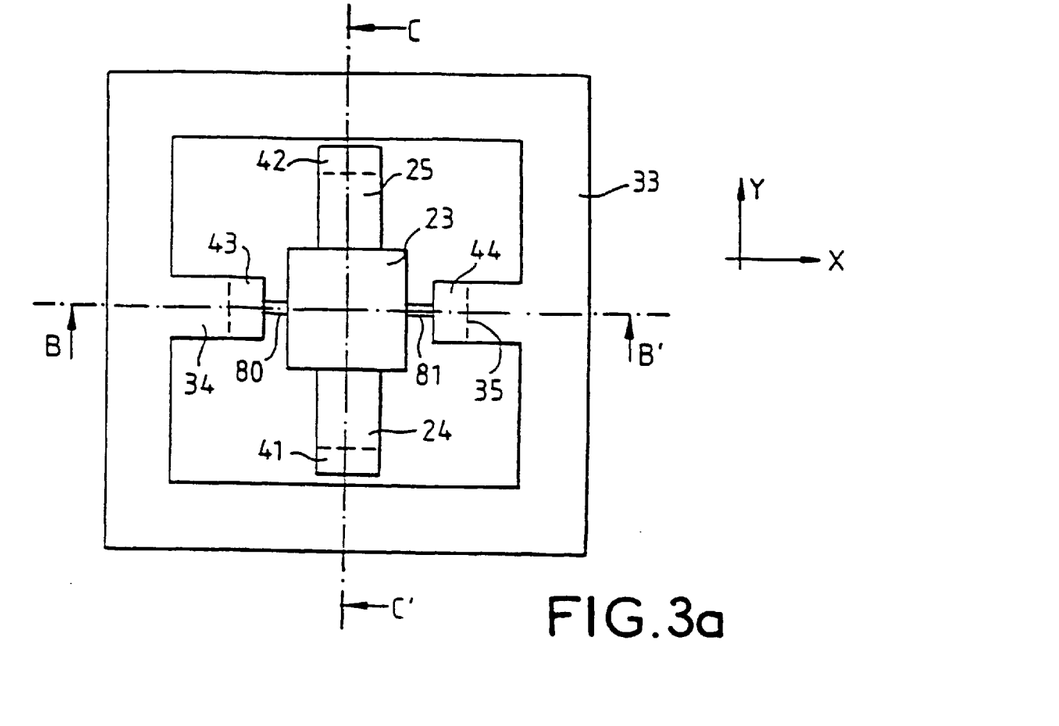
FIG. 3a illustrates an example of an upper wafer 7 used in an accelerometer according to the invention.
Figure 3B:
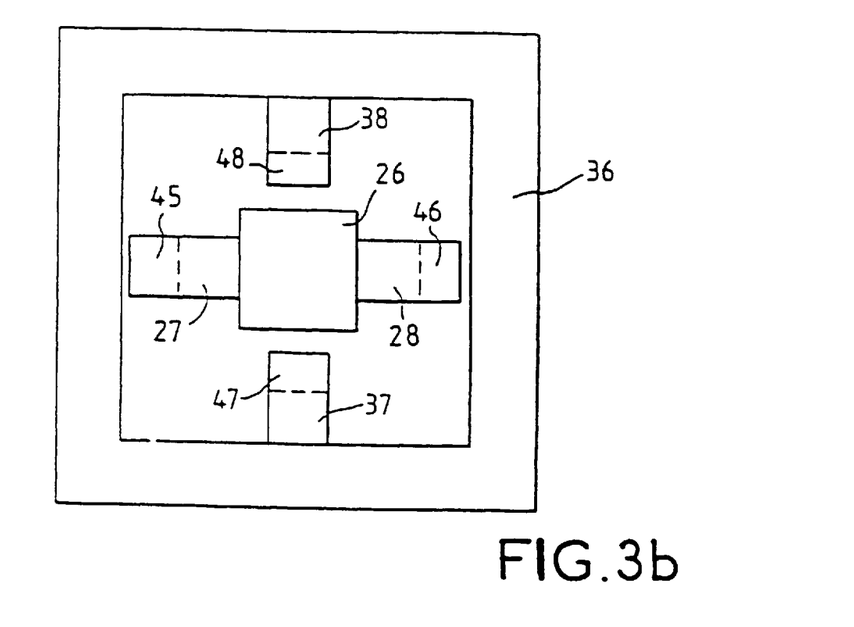
FIG. 3b illustrates an example of a lower wafer 8 used in an accelerometer according to the invention.

FIGS. 3*a* and 3*b* respectively depict views from above of the upper wafer 7 and of the lower wafer 8.

The upper wafer 7 comprises the upper part of the moving mass 21 consisting of a central part 23 and of two immobilizinging arms 24 and 25 which lie one on either side of the central part and are oriented along the axis Y depicted in FIG. 3*a*.

The upper wafer 7 also comprises the upper part 31 of the fixed frame, which consists of a peripheral part 33 and of two arms 34 and 35, which in FIG. 3*a* are oriented along the axis X.

Part 42 of the immobilizing arm 25 and part 43 of the immobilizing arm 24 constitute counter-stops on the part 21 of the moving mass.

Part 43 of the immobilizing arm 34 and part 44 of the arm 35 constitute stops on the part 31 of the fixed frame.

This wafer 7 also comprises two suspension arms 80 and 81 connecting the central part 23 of the moving mass to the arms 34 and 35 secured to the fixed frame.

FIG. 3*b* relates to the lower wafer 8. This wafer 8 comprises the lower part 22 of the moving mass which consists of a central part 16 and of two immobilizing arms 27 and 28 which in FIG. 3*b* are oriented along the axis X.

The wafer 8 also comprises the lower part 32 of the peripheral frame, which consists of a peripheral part 36 and of two arms 47 and 48 which in FIG. 3*b* are oriented along the axis Y.

Part 42 of the immobilizing arm 25 and part 41 of the immobilizing arm 24 constitute counter-stops facing the stop 48 part of the arm 38 and the stop 47 part of the arm 37, respectively.

Likewise, part 45 of the immobilizing arm 27 and part 46 of the immobilizing arm 28 constitute counter-stops facing the stop 43 of the arm 34 and the stop 44 of the arm 35, respectively.

Figure 4A:
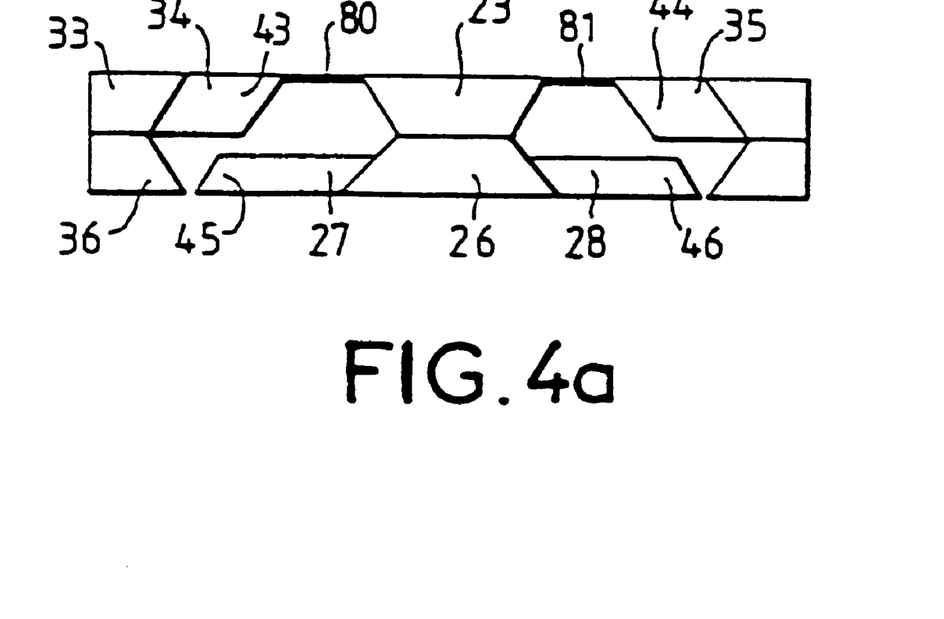
FIG. 4a illustrates a cross-section on a plane BB' of the assembly of the wafers 7 and 8 which are illustrated in FIGS. 3a and 3b.
Figure 4B:
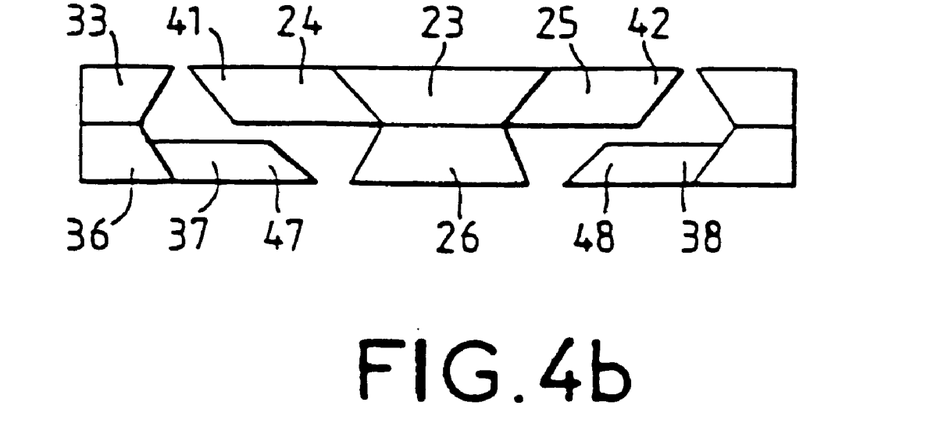
FIG. 4b illustrates a cross-section on a plane CC' of the assembly of the wafers 7 and 8 which are illustrated in FIGS. 3a and 3b.

FIGS. 4*a* and 4*b* illustrate cross-sections on planes BB' and CC' depicted in FIG. 3*a* or 3*b*, of the stack of wafers 7 and 8, and show how the various stops and the various counter-stops can be produced.

The arms 27, 28, 37 and 38 of the lower wafer 8 have the same architecture. They consist of an element of thickness $e_1$ less than the thickness $e_0$ of the thickness of the silicon wafer. The difference in level between elements of thickness $e_1$ and those of thickness $e_0$ makes it possible to produce the stops or counterstops for the counter-stops or stops respectively facing them.

The arms 24, 25, 34 and 35 of the upper wafer 7 all have the same architecture. They consist of a single element of thickness $e_0$, part of each arm facing the thinned part of an arm on the lower wafer 8.

Figure 5A:
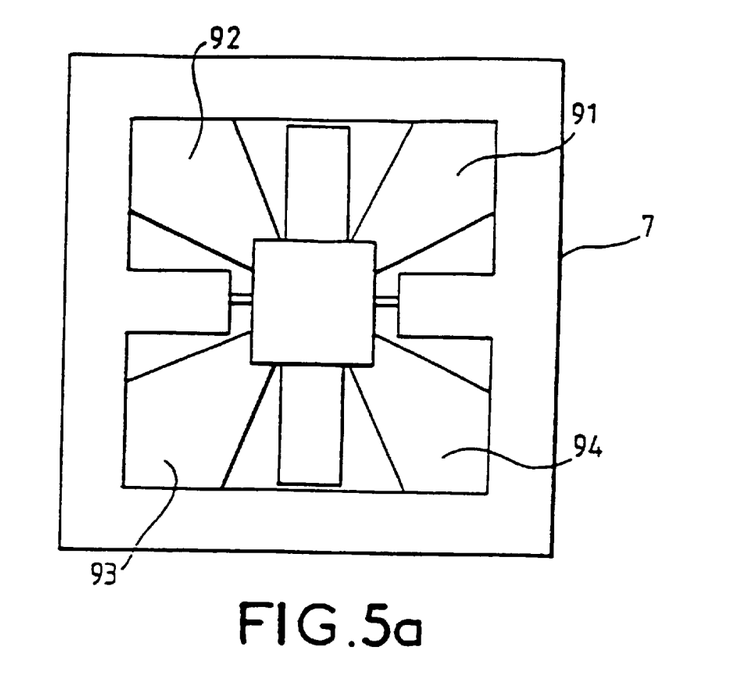
FIG. 5a illustrates an example of an upper wafer 7 comprising 4 guide arms.
Figure 5B:
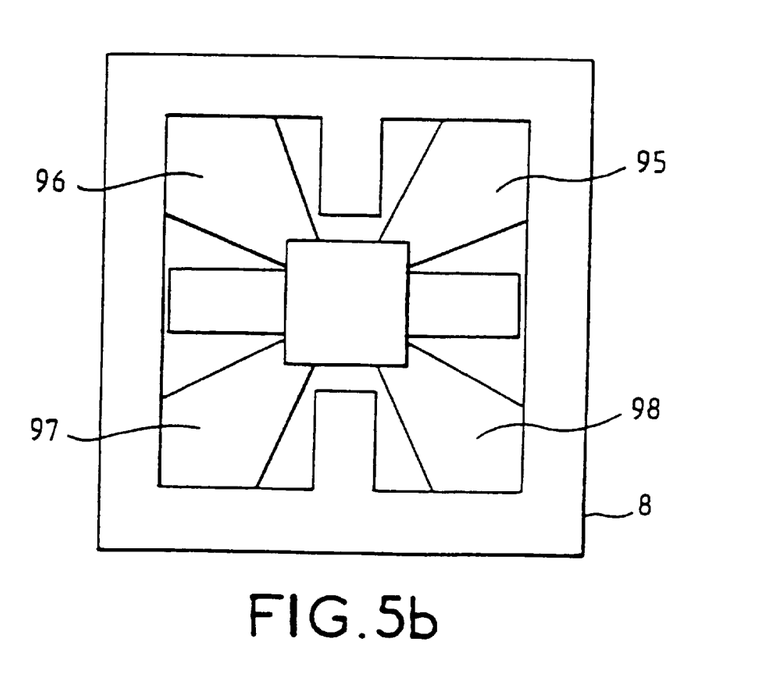
FIG. 5b illustrates an example of a lower wafer 8 comprising 4 guide arms.

According to an alternative form of the invention, the wafers 7 and 8 also comprise slender guide arms as illustrated in FIGS. 5*a* and 5*b*.

The upper wafer 7 comprises four guide arms 91, 92, 93, 94 which are oriented at 45° to the axes X and Y, in a plane parallel to the plane of the moving mass.

These guide arms may, more specifically, lie in the same plane as the plane containing the suspension arms 80 and 81.

Likewise, the lower wafer 8 comprises four slender guide arms 95, 96, 97, 98 also oriented at 45° to the axes X and Y. These guide arms may lie in the lower part of the wafer 8.

The various immobilizing, suspension and guide arms may be produced by steps of masking by photolithography then etching.

The wafers 7 and 8 for that may advantageously be wafers of the SIMOX type containing an embedded layer of oxide and also covered with oxide, the well-controlled thickness of silicon between two oxide layers makes it possible for the dimensions of the suspension arms or of the guide arms to be gauged very accurately.

Before the wafers 7 and 8 are assembled in the conventional way, the immobilizing arms are connected both to the mass which will later be a moving mass, and to the peripheral frame. At the time of manufacture of the stops and counter-stops, by chemical etching, a precut is made at the intended openings between immobilizing arm and or peripheral frame.

After the two wafers have been assembled, the final cut for freeing the moving mass from the fixed frame is made at the precuts, by laser attack. More specifically, the precuts are made respectively:

on the wafer 7 between the element 33 and the immobilizing arms 25 and 24;

on the wafer 8 between the element 26 and the arms 38 and 37.

This type of operation makes assembling the wafers 7 and 8 easier.

Figure 6:
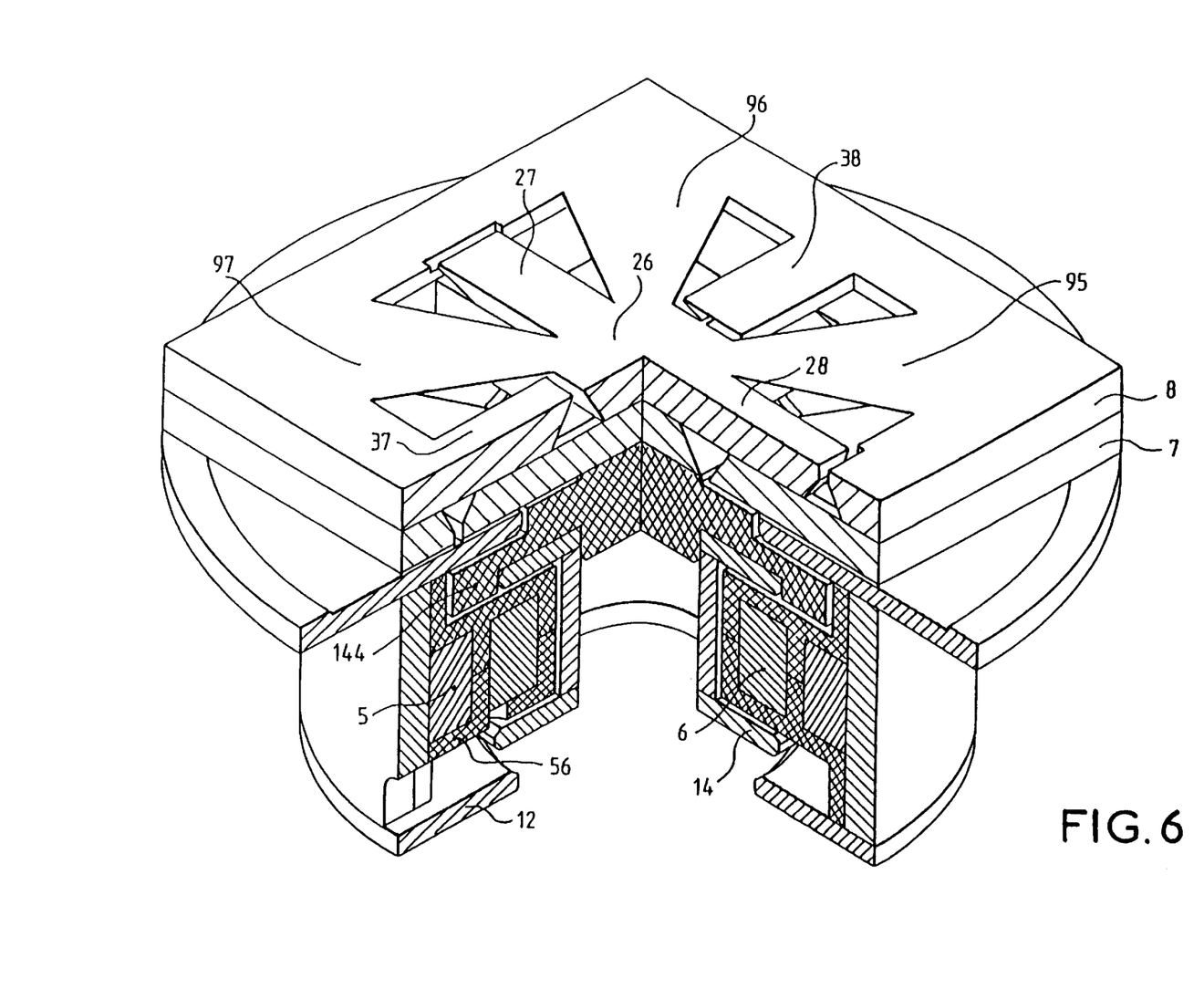
FIG. 6 illustrates a perspective view of an example of an accelerometer according to the invention.

FIG. 6 depicts a perspective view of one example of an accelerometer according to the invention, using a so-called negative-stiffness motor and a silicon part made from a stack of two wafers.

The motor part comprises a pole piece 12 fixed to the part 33 of the silicon wafer 7.

The piece 12 is a cylindrical container which has two openings in planes perpendicular to the axis of revolution of the cylinder. One opening allows the element 14 to be fixed to the moving mass. The other opening is made so that the forces of the magnetic fields which present in the container can be adjusted as a function of the polar mass of the element 121, and to allow a position of equilibrium to be set.

The pole piece 14 is connected to the central part 23 of the mass 2 via the part 144 which may typically be made of pyrex for example.

The assembly which consists of the coil 6 and the magnet 5 is encapsulated in a plastic 56 giving the assembly integrity.

FIG. 6 shows one configuration of an accelerometer comprising silicon wafers, in which wafers guide arms such as those depicted, namely the elements 95, 96 and 97 have especially been produced. This figure also shows the two immobilizing arms 27 and 28 which are connected to the central part 26 of the moving mass inscribed in the wafer 8, and the two arms 37 and 38 connected to the fixed frame 36, also inscribed in the wafer 8.

What is claimed is:

1. An electromagnetic accelerometer, comprising:

a peripheral frame;

a mass suspended from the peripheral frame;

a plurality of strain gauges configured to detect displacement of the mass; and a magnetic motor including a first pole piece defining a chamber, a second pole piece positioned in the chamber and coupled to the mass, the second pole piece being located in a magnetic field exerting a magnetic force on the second pole, a permanent magnet coupled to the first pole piece and generating the magnetic field, and a coil coupled to the first pole piece, the permanent magnet and the coil surrounding at least a portion of the second pole piece.

2. An electromagnetic accelerometer according to claim 1, further comprising:

a non-magnetic element coupling the second pole piece to the mass.

3. An electromagnetic accelerometer according to claim 1, wherein the first pole piece comprises:

a main part; and a secondary part coupled to the main part by the permanent magnet, the coil being coupled to the secondary part.

4. An electromagnetic accelerometer according to claim 1, wherein the second pole piece comprises:

a central portion aligned perpendicularly to a surface of the mass, the central part having first and second ends; and first and second perpendicular portions at respective of the first and second ends of the central portion, said first and second perpendicular portions being oriented parallel to the surface of the mass, the first and second perpendicular portions and the first pole piece defining corresponding gaps between the first pole piece and the second pole piece.

5. An electromagnetic accelerometer according to claim 1, wherein the peripheral frame and the mass are formed of a lower silicon wafer and an upper silicon wafer stacked on the lower silicon wafer, the upper silicon wafer comprising:

an upper portion of the mass including a first counter-stop and a second counter-stop, the first counter-stop and the second counter-stop extending in a plane parallel to the surface of the mass;

an upper portion of the peripheral frame including a first stop and a second stop corresponding to the first counter stop and the second counter stop, a first suspension arm connecting the first counter-stop to the first stop, the first suspension arm including a first piezoelectric gauge, and a second suspension arm connecting the second counter-stop to the second stop, the second suspension arm including a second piezoelectric gauge.

6. An electromagnetic accelerometer according to claim 5, wherein the upper portion of the mass comprises:

two immobilizing arms; and a central part positioned between the two immobilizing arms, the two immobilizing arms forming the first counter-stop and the second counter-stop.

7. An electromagnetic accelerometer according to claim 6, wherein the upper silicon wafer comprises:

a plurality of slender guide arms connecting the mass to the peripheral frame.

8. An electromagnetic accelerometer according to claim 5, wherein the lower silicon wafer comprises:

a lower portion of the mass including a third counter-stop and a fourth counter-stop; and a lower portion of the peripheral frame including a third stop and a fourth stop corresponding to the third counter-stop and the fourth counter-stop.

9. An electromagnetic accelerometer according to claim 8, wherein the lower portion of the mass comprises:

two immobilizing arms; and a central part positioned between the two immobilizing arms, the two immobilizing arms forming the third counter-stop and the fourth counter-stop.

10. An electromagnetic accelerometer according to claim 1, further comprising:

means for applying a current to the coil when the mass moves to keep the mass and the second pole piece in a fixed position.

* * * * *

UNITED STATES PATENT AND TRADEMARK OFFICE
CERTIFICATE OF CORRECTION

PATENT NO. : 6,076,403
DATED : June 20, 2000
INVENTOR(S): Pierre GIROUD et al.

It is certified that an error appears in the above-identified patent and that said Letters Patent is hereby corrected as shown below:

On the title page, item [86], the 371 date is incorrectly listed. It should be:

--[86] PCT No.:    PCT/FR96/01969

§ 371 Date:    Apr. 5, 1999

§ 102(e) Date:    Apr. 5, 1999--

Signed and Sealed this

First Day of May, 2001

Attest:

NICHOLAS P. GODICI

Attesting Officer    Acting Director of the United States Patent and Trademark Office